Aug. 17, 1943. G. J. PAL 2,327,059
MOTION PICTURE
Filed June 7, 1940  2 Sheets-Sheet 1

GEORGE JULIUS PAL
INVENTOR.

BY Fred M Vogel
AGENT

Aug. 17, 1943.  G. J. PAL  2,327,059
MOTION PICTURE
Filed June 7, 1940  2 Sheets-Sheet 2

GEORGE JULIUS PAL.
INVENTOR.
BY
AGENT

Patented Aug. 17, 1943

2,327,059

UNITED STATES PATENT OFFICE 2,327,059

MOTION PICTURE

George Julius Pal, Beverly Hills, Calif.

Application June 7, 1940, Serial No. 339,241

3 Claims. (Cl. 88—16)

My invention relates to the production of motion pictures with the use of puppets.

The so-called animated cartoon motion pictures are, of course, well known and are very successful and the various methods of producing the same are known to those skilled in this art. However, as these pictures are produced by photographing flat drawings or cartoons, they do not have a third dimensional effect. To produce this effect it has been proposed to use three-dimensioned flexible figures, such as jointed puppets, and to move portions thereof into a different position for each picture. While this system requires the use of only a single puppet, it has several disadvantages. For example, the adjustment of the moving part frequently causes a displacement in the remaining portions of the puppet with the disadvantageous result that, in the finished picture, those portions which were intended to be stationary have a slight jerky movement. In addition it is difficult to control the movement of the parts because after a part has once been moved from a given position it is impossible to determine the amount it has been moved. It is also impossible to make all portions of the puppets adjustable and this is a particular disadvantage in sound pictures in which a movement of the lips is desired, or in cases in which a change in facial expression is desired. Furthermore, the making of retakes involves a repetition of the entire process.

To overcome the above difficulties it has been suggested to use rigid puppets which differ in shape, coloration, etc., for each picture. For example, to produce a change in facial expression one would use a plurality of rigid puppets which are the same except for the facial expression. Motion pictures are made of these puppets by the methods employed in making animated cartoons while using a different puppet for each picture. Excellent results are obtained in this manner and the puppets can be used in several scenes in which the same movement must be produced, or can be used in other sequences so as to produce different movements. In addition, retakes can, of course, be effected in a simple manner. However, this method has the disadvantage that the production of the large number of rigid puppets required is expensive and time consuming.

The main object of my invention is to overcome the above difficulties in the use of puppets which are flexible or are entirely rigid.

A further object is to simplify the production and reduce the cost of motion pictures made with puppets.

A further object of my invention is to provide a simple and accurate method of aligning the puppets and parts thereof.

A further object is to provide an improved method for the registration of the puppets.

A further object is to produce a series of puppets or portions thereof which represent a given movement and which can be used as frequently as desired and in different scenes or motion pictures to produce this movement or variations thereof.

Additional objects and advantages of my invention will appear as the description progresses.

In accordance with the invention I use puppets which are provided with replaceable, and in some cases adjustable, portions and change only these portions or the positions thereof to produce the desired movement. More particularly, I may use the same stationary portion of the puppet for all pictures of a given scene and produce the movement by a plurality of replaceable members which represent different stages of the movement and one of which is attached to the stationary portions of the puppet for the taking of each picture. These replaceable portions may differ in shape, position, or coloration so as to produce in the motion picture a change in form, position or color.

To produce a scene in which a puppet remains stationary and moves its lips in accordance with a certain sound, I may use a puppet whose head has a replaceable mouth portion. I provide a number of mouth portions which are adapted to be selectively placed in the head and on each of which the lips are located in a different position so as to be in agreement with the sound. Thus to produce the scene it is only necessary to selectively attach the mouth portions and take the pictures with each portion in place, which of course, reduces the cost of producing the scene. In addition these mouth portions may be used in a puppet which is entirely different from the first puppet or which is the same as the first puppet but is in a different position. For example, by using the same mouth portions and only two puppets it is possible to produce a scene in which the puppet is standing and speaking and a second scene in which the puppet is sitting down and speaking.

In many cases it is desired to produce a scene in which a puppet remains stationary and changes only its facial expression. In such cases I provide a plurality of face portions which can be removably attached to the head and each of which has a slightly different facial expression. Thus, to produce the various pictures it is necessary to change only these face portions. If it is desired to produce also a simple movement of the head, I may provide a pivotal mounting for the heads. Furthermore, if it is desired to produce also a lip movement, I may use replaceable face portions which are adapted to be provided with replaceable mouth portions. The term "stationary portion" of a puppet is understood to mean a portion which remains in the same position for a plurality of pictures whereas the term "moving portion" is to be understood to mean a portion which produces a movement in the completed motion picture.

My invention also includes a method for registration of the puppets. For this purpose I may provide the puppets with pins whereby they are arranged in line on registration boards. With the puppets so arranged I examine the same and adjust them so that they will be in the proper relative positions. The puppets are then arranged one by one in front of a camera while using the same pins to locate the same. By this method I ensure that all stationary portions of the puppets will appear stationary and the moving portions will appear to move in the proper manner in the completed pictures.

In order that the invention may be clearly understood and readily carried into effect I shall describe the same in more detail with reference to the accompanying drawings in which.

Figures 4, 5:
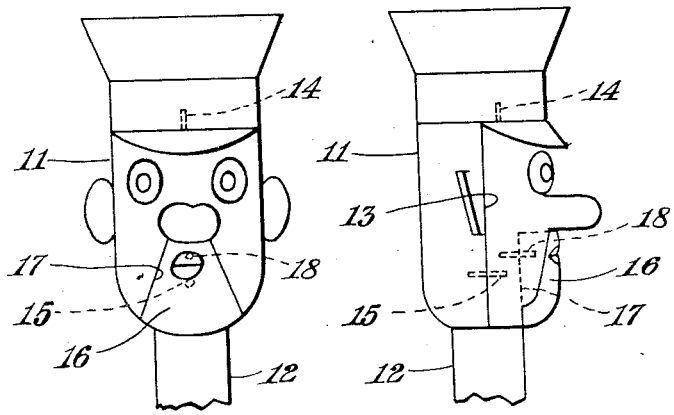
Figure 3E:
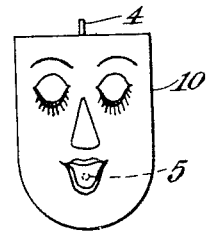
Figures 6A, 6B, 6C, 6D, 6E:
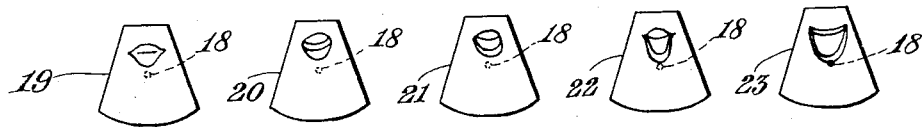
Figure 7A:
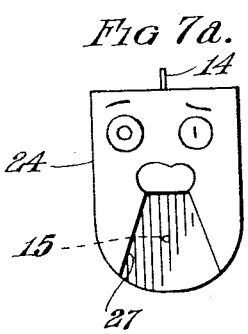
Figure 7B:
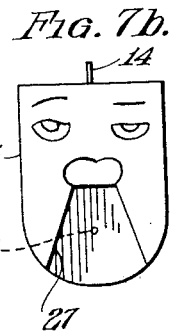
Figure 7C:
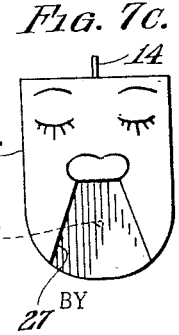
Figure 8:
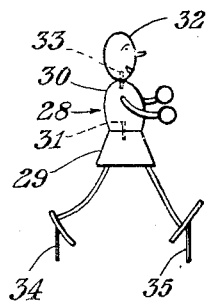
Figures 9A, 9B, 9C, 9D, 9E, 9F:
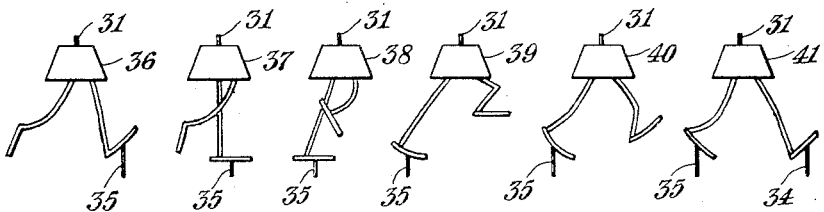
Figure 10A:
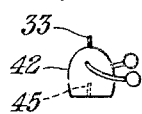
Figure 10B:
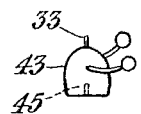
Figure 10C:
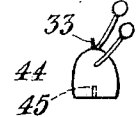
Figure 11A:
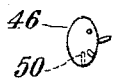
Figure 11B:
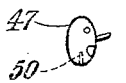
Figures 12A, 12B, 12C:
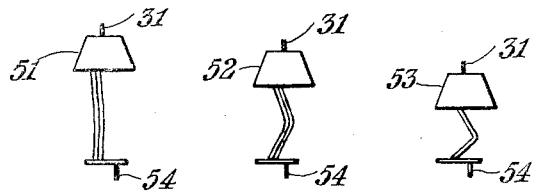
Figures 11C, 11D:
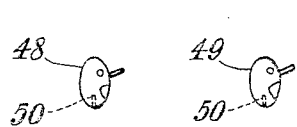
Figure 13:
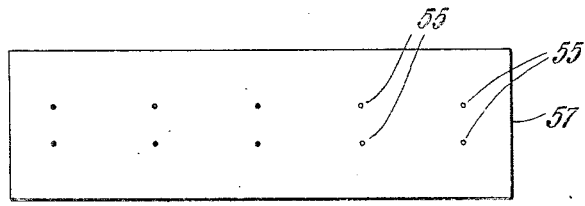
Figure 14:
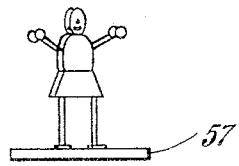
Figure 15:
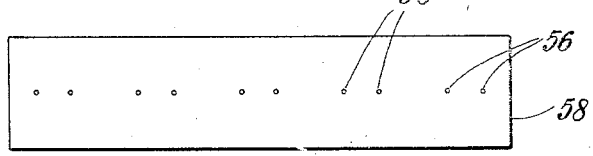
Figure 16:
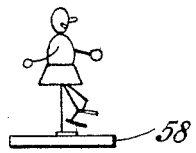
Figure 17:
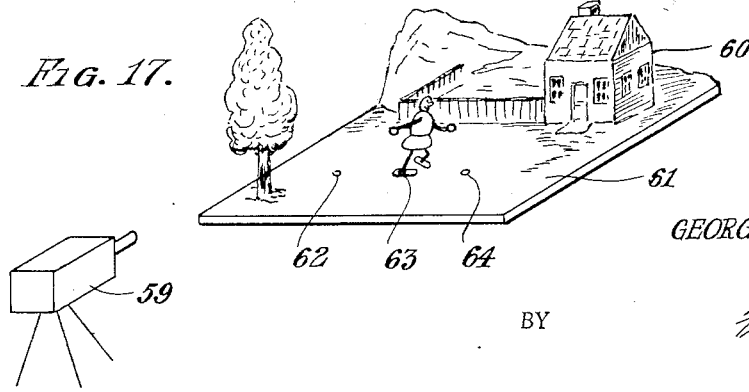

Figs. 3a to 3e inclusive, are front views of face portions,

Fig. 4 is a front view of the head of a puppet,

Fig. 5 is a side view of the head of Fig. 4,

Figs. 6a to 6e inclusive, are front views of mouth portions,

Figs. 7a to 7c inclusive, are front views of face portions,

Fig. 8 is a side view of a puppet embodying the invention,

Figs. 9a to 9f inclusive, are side views of leg portions,

Figs. 10a to 10c inclusive are side views of arm portions,

Figs. 11a to 11d inclusive, are side views of head portions,

Figs. 12a to 12c inclusive, are side views of leg portions,

Fig. 13 is a plan view of a registration board,

Fig. 14 is a side view of the registration board of Fig. 13 with several puppets in position thereon, Fig. 15 is a plan view of a registration board, Fig. 16 is a side view of the registration board of Fig. 15 with several puppets in position thereon, and Fig. 17 is a perspective view of a scene being photographed.

Figure 1:
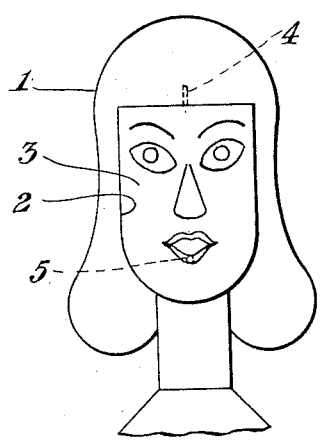
Figure 1 is a front view of the upper portion of a puppet.
Figure 2:
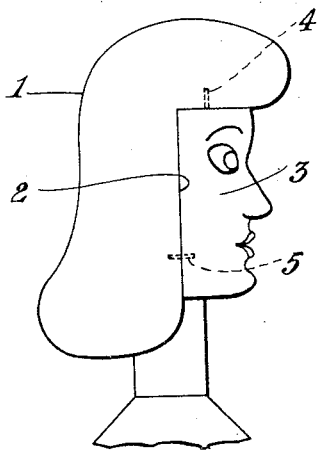
Fig. 2 is a side view of the puppet shown in Fig. 1.
Figure 3A:
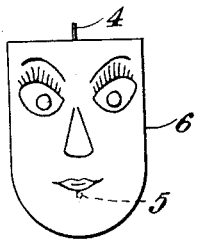
Figure 3B:
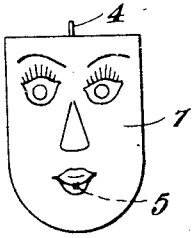
Figure 3C:
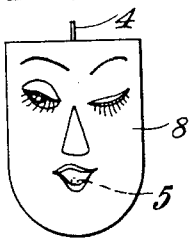
Figure 3D:
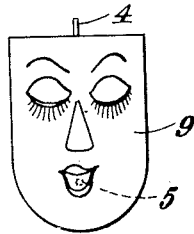

In Figs. 1 and 2 the reference numeral 1 indicates the head of a puppet. The head may be carved from wood or molded from plastic material such as plaster of Paris and may be rigidly secured to the body as shown or may be pivotally mounted so as to be rotatable about a vertical axis. The head is provided with a cavity 2 into which fits a face portion 3. To ensure proper alignment of the face portion I provide the same with two pins 4 and 5 which fit into holes in the head. The pins 4 and 5 may be slightly flexible to permit the face portions to be inserted in the cavity.

The face portions 6, 7, 8, 9 and 10 shown in Figs. 3a to 3e inclusive, are shaped so as to fit into the cavity 2 of Figure 1 and each provided with pins 4 and 5. These face portions may be carved from wood or molded from plastic material and differ from each other in stages of movement of some part. As shown these face portions represent a movement of the eyelids and lips, but other movements, such as changes in facial contour or in coloration can, of course, be employed.

By selectively placing the face portions 6, 7, 8, 9 and 10 in the head of Figs. 1 and 2 and taking a picture for each face portion, the desired movement can be obtained. These same face portions may, of course, be used with other puppets and may be used in different sequences or combinations. For example, by using them in the order 6—7—8—9—10 one obtains a closing of the eyelids and opening of the mouth, whereas by using them in the order 10—9—8—7—6 one would obtain an opening of the eyelids and closing of the mouth. To obtain a combination of these movements they would be used in the order 6—7—8—9—10—9—8—7—6.

The puppet head 11 shown in Figures 4 and 5 has a pivot portion 12 by which it can be attached to the body (not shown) and is provided with a cavity 13. Fitting into cavity 13 and held therein by two slightly flexible pins 14 and 15 is a removable face portion provided with a cavity 17. Fitting into cavity 17 and held in place by a pin 18 is a mouth portion 16.

The mouth portions, 19, 20, 21, 22 and 23 of Figures 6a to 6e inclusive, are adapted to fit into the cavity 17 of Figs. 4 and 5 and have the lips in different positions. Thus, if only a lip movement is desired the pictures are taken with each of these mouth portions placed in the cavity 17.

The face portions 24, 25 and 26 shown in Figures 7a to 7c inclusive, are provided with pins 14 and 15 and are adapted to be selectively placed in the cavity 13 of Figures 4 and 5 so as to produce a movement of the eyelids. These face portions are provided with cavities 27 adapted to receive the mouth portions of Figs. 6a to 6e.

From the above it will be noted that various movements can be obtained by combining the face portions 24, 25 and 26 and the mouth portions 19, 20, 21, 22 and 23 with the head of Figs. 4 and 5. For example, by changing both the face portions and mouth portions it is possible to obtain both a lip movement and a movement of the eyelids. By selectively using all of the mouth portions with either one of the face portions 24, 25 and 26 it is possible to obtain a lip movement with several stationary eyelid positions and by selectively using all of the face portions with either one of the mouth portions 19, 20, 21, 22 and 23 it is possible to obtain an eyelid movement with several stationary lip positions. Furthermore, it is of course, possible to arrange the face portions and mouth portions in different order and sequence to obtain various movements. Furthermore, the face portions can be used with other heads and the mouth portions can be used with other face portions.

From the above it appears that the use of replaceable portions of the puppets makes it possible to obtain a large number of different movements with only a relatively small number of parts. Furthermore, by keeping proper records of the parts used in taking a given scene it is possible to retake the scene quickly and accurately.

The puppet 28 shown in Fig. 8 comprises a leg portion 29, a body or arm portion 30 secured to the leg portion 29 by a pin 31, and a head 32 secured to the body portion 30 by a pin 33. The legs are provided with registration pins 34 and 35 for a purpose later to be described.

The leg portions 36, 37, 38, 39, 40 and 41 shown in Figs. 9a to 9f inclusive, which are similar to the leg portion 29 of Fig. 8 and are each provided with a pin 31, have one leg provided with a registration pin 35; the portion 41 also having a registration pin 34. The legs are in the various positions necessary to produce a step and by selectively attaching these portions to the body portion 30 of Fig. 8 and taking a picture with each leg portion in place, it is possible to produce a motion picture of the puppet taking one or more steps. In these leg portions the upper part may be of wood or plastic material, and the legs may be rigid or semi-rigid and are made of wood, plastic material or wire.

The leg portions can also be used to produce a simultaneous movement of several puppets. For example, it may be desired to produce a scene of seven puppets walking in line in which case each of the puppets would be provided with one of the leg portions and a picture taken. The leg portions would then be interchanged so that each puppet is provided with that leg portion which depicts the next stage in the movement and a second picture taken. This interchanging of leg portions would be repeated to obtain a step for each puppet and the entire process could be repeated to produce any number of steps.

The arm portions 42, 43 and 44 shown in Figs. 10a and 10c are each provided with a pin 33 for holding a head and with a cavity 45 for receiving the pin 31 of the leg portions. The arms are in different positions to produce a raising of the same and the portions may be selectively attached to the puppet of Fig. 8, or to other puppets. By using these arm portions in the order 42—43—44—43—42 it is possible to produce a motion picture showing the raising and lowering of the arms.

The heads 46, 47, 48 and 49 of Figures 11a to 11d are similar to the head 32 of Fig. 8 except that the lips are in different positions. These heads are provided with cavities 50 adapted to receive the pin 33 so that they may be selectively attached to the body portions of Fig. 8 or Figs. 10a to 10c or to other puppets.

The leg portions 51, 52 and 53 of Figs. 12a to 12c are each provided with a pin 31 and are similar to the leg portions of Figs. 9a to 9f except that the legs are positioned to produce a bending movement of the knees. The feet are provided with registration pins 54 for a purpose later to be described.

It will be apparent to one skilled in the art that the leg portions 36 to 41, the arm portions 42 to 44 and the heads 46 to 49 may be combined into various combinations so as to produce either leg movements, arm movements, lip movements or combinations thereof. Furthermore, any set of these portions may be used in different puppets and with different sets of the other portions, in either the same or different motion pictures. For instance, the leg portions 29 and 36 to 41 may be used with a puppet which is otherwise rigid or has a head of the construction described in connection with Figs. 1 to 7c.

My method of registration of the puppets or portions thereof will be described in connection with Figs. 13 to 17. Referring to Fig. 13, the registration board 57 shown therein is provided with two parallel rows of holes 55 adapted to receive the registration pins 34, 35 and 54, shown in Figs. 8, 9a to 9f, and 12a to 12c. The rows are spaced apart a distance equal to the distance between the two legs. As indicated in Fig. 14 the puppets are arranged one in front of the other on board 57 with the registration pins in the holes 55 and then viewed in the direction of the rows to determine if the parts of the puppets are in the proper position.

The registration board 58 shown in Fig. 15 is provided with a single row of holes 56 adapted to receive the registration pins and arranged in pairs spaced apart a distance equal to the distance between the legs. As shown in Fig. 16 the puppets are arranged sidewise in a row on the board 58 and then viewed in the direction of the row to determine if the parts are in proper alignment. For example, the stationary portions should be in alignment and the legs of the several puppets should be in the proper relative position to produce the desired movements.

Instead of aligning the entire puppets on the boards 57 and 58, only the leg portions 29 and 36 to 41 may be aligned.

After the various portions have been aligned by the use of the registration boards, the pictures are taken in a manner to be described in connection with Fig. 17 in which reference numeral 59 indicates a motion picture camera arranged to take pictures of a scene 60 having a base portion 61 provided with a line of holes 62, 63 and 64. If a step movement is to be produced, the puppet of Fig. 8 is arranged with the registration pins 34 and 35 in the holes 62 and 63 respectively and a picture is taken. The leg portion 29 of the puppet is replaced by the leg portion 36 of Fig. 9a and the puppet is then arranged with the registration pin 35 in hole 63 and a picture is taken. In a similar manner pictures are taken with the puppet provided with each of the leg portions 37, 38, 39, 40 and 41 with the registration pin 35 of each leg portion in the hole 63. The leg portion 41, which indicates the completion of the step will have the registration pin 34 in hole 64. To produce a second step the above process is repeated using the pins 35 of portions 29 and 36 to 40 in the hole 64.

It may be desired to produce a scene in which a large number of puppets, for instance twenty, are arranged in a circle and kick their legs. For this purpose I arrange in a circle and at equal spacings, twenty puppets which are the same except for the leg portions which represent different stages of the kicking movement. The leg portions of adjacent puppets represent consecutive stages in the movement. Between the taking of the pictures I rotate the puppets so that each puppet will be moved into the position previously occupied by the adjacent puppet. Thus, by using only twenty puppets and continuing the stepwise rotating of them during the taking of the pictures, I may produce a motion picture of the twenty puppets kicking simultaneously, although not in unison.

The above method may be employed for other purposes, for instance to produce a picture of drops of water falling from a fountain. In this case the drops of water, represented by small drops of plastic material, are suspended at various heights around the fountain by means of very thin wires. The fountain is then stepwise rotated between the taking of the pictures whereby the effect of falling drops is obtained in the finished motion picture.

Although I have described my invention with reference to specific examples and applications I do not desire to be limited thereto because obvious modifications will readily appear to one skilled in this art. Furthermore, my invention is not limited to the particular puppets or movements described.

What I claim is:

1. A method of making a motion picture depicting a predetermined sequence of movement of a series of puppets representing a character, each puppet having adjustable portions and registration members, comprising the steps of arranging the series of puppets with their registration members engaging complementary holes arranged in alignment on a support, viewing the series of puppets in the direction of alignment while individually adjusting the adjustable portions of the several puppets to the various stages of the predetermined movement by comparison, selectively placing the puppets in the scene to be photographed with the registration members engaging holes at appropriate locations in the scene, and individually photographing each puppet when in position.

2. A method of making a motion picture depicting a predetermined sequence of movement of a series of puppets representing a character, each puppet having adjustable portions and registration members, comprising the steps of arranging the series of puppets with their registration members engaging complementary holes arranged in appropriate alignment on a support, viewing the puppets in the direction of said alignment while individually adjusting the adjustable portions of the several puppets to the various stages of the predetermined movement by comparison, arranging the puppets with the registration members in alignment on a support and with the puppets arranged at right angles to their positions during the first alignment, viewing the puppets in the direction of said second alignment while individually adjusting the adjustable members of the several puppets to the various stages of the predetermined movement by comparison, separately and consecutively placing the individual puppets in the scene to be photographed with the registration members engaging holes at appropriate locations in the scene, and individually photographing each puppet when in position.

3. A method of making a motion picture depicting a walking figure represented by a series of puppets each having adjustable legs provided with registration members, comprising the steps of arranging the series of puppets with their registration members engaging holes arranged in alignment on a support, viewing the puppets in the direction of alignment while individually adjusting the legs of the several puppets by comparison to the various stages of the walking movement, separately placing the puppets in the scene to be photographed with the registration members engaging holes at appropriate locations in the scene corresponding to the positions of the figure during the walking movement and individually photographing each puppet when in position.

GEORGE JULIUS PAL.